April 21, 1931. W. G. WOLFE 1,802,099
WIDE ANGLE PROJECTION
Filed May 16, 1927 2 Sheets-Sheet 1
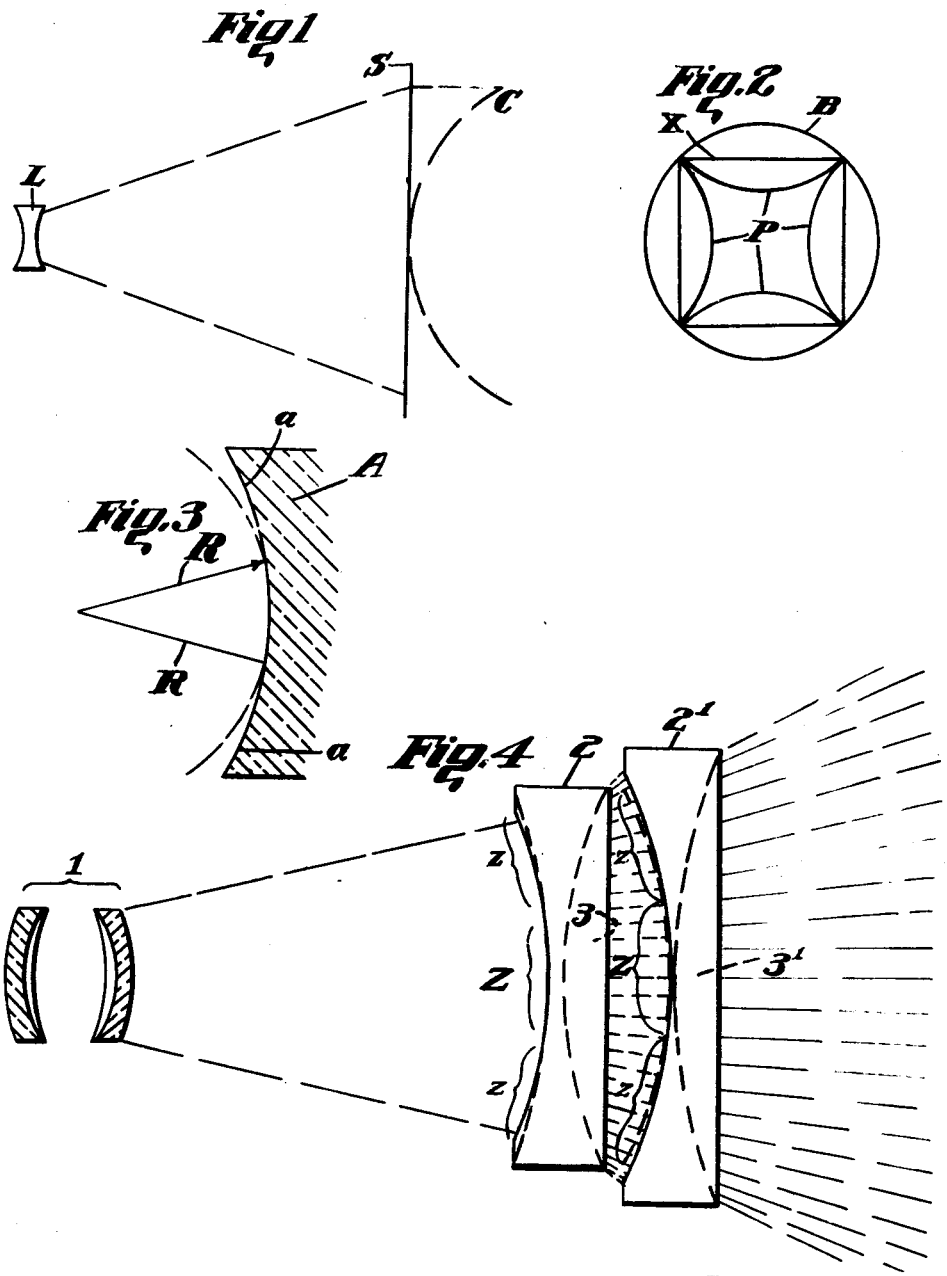

April 21, 1931. W. G. WOLFE 1,802,099
WIDE ANGLE PROJECTION
Filed May 16, 1927 2 Sheets-Sheet
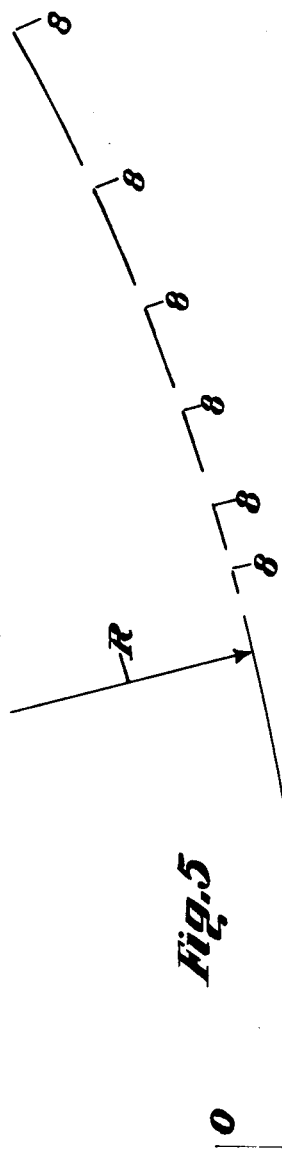
Fig.5
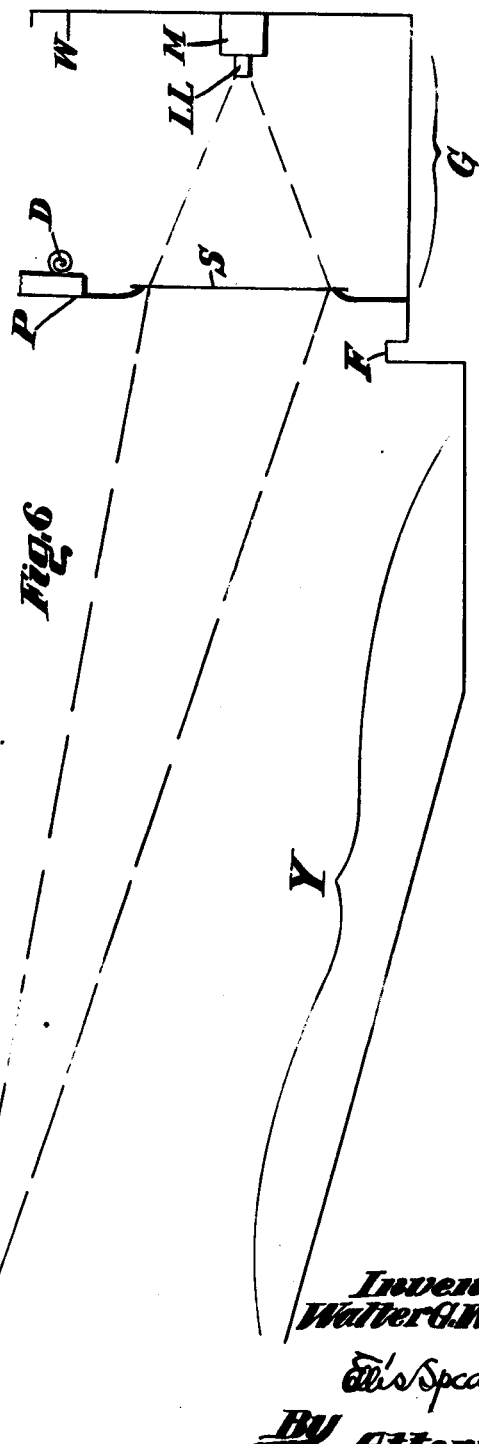
Fig.6
Inventor
Walter G. Wolfe
Ellis Spear Jr.
By Attorney Patented Apr. 21, 1931

1,802,099

UNITED STATES PATENT OFFICE

WALTER G. WOLFE, OF GREENWOOD, MASSACHUSETTS, ASSIGNOR TO WILMOT R. EVANS, TRUSTEE, OF BOSTON, MASSACHUSETTS

WIDE-ANGLE PROJECTION

Application filed May 16, 1927. Serial No. 191,589.

In the projection of pictorial effects for observation, modern developments have introduced many difficulties. As the moving picture so-called represents a maximum of these difficulties I shall refer to this art as one to which my invention is particularly applicable, although obviously capable of a wide range of usefulness. In such projection where photographic detail must be highly enlarged in order to be observable by an audience, it has been heretofore necessary to locate the projection apparatus at a distance from the screen in order to get sufficient magnification. This has brought projecting apparatus back into or over the audience and in actual practice this arrangement has come to be recognized as a very serious menace to safety.

While back stage projection has been an ancient and obvious possibility, its practice under such conditions as are present with the moving picture industry has been impossible.

In accordance with my invention I provide for back stage projections so that the projector may be located away from the audience and behind the plane of the fire curtain. The desirability of such an arrangement is obvious. Aside from the safety factor as regards reduction in fire risk and consequent saving in insurance, it permits the picture to be shown in a lighted auditorium without any loss of strength or detail of the image on the screen, and without any distortion, due to the fact that the beams from the back stage projector are horizontal, whereas those from the usual elevated projector at the back of the auditorium are angularly downward, giving the so-called "key-stone" distortive effect which becomes more and more pronounced as the observer moves away from the center line of the theatre towards the wings. Moreover, with the back stage projector, it is possible to illuminate the stage while the motion picture is displayed, so that actors may appear on the stage in full limelight during the run of the picture and the audience may observe both actors and picture simultaneously.

Where the projector is located in the back of the auditorium, it is necessary to enclose it in a booth which itself occupies much valuable seating space that might otherwise be used at each performance, thus resulting in a direct economic loss which is constant and continuing. The whir of the motors is also annoying to the audience and detracts from the desirability of the seats in proximity to the operator's booth. Moreover, the projector is often located a distance of 150 feet or more from the screen, thus necessitating higher powered lighting units with increased factor of heat generation, whereas with my back stage projector location the distance from the screen is from seventeen to twenty feet, with resultant economy in power consumption and reduction in fire risk, as well as eliminating the operator's booth from the seating space of the theatre.

The possibilities in accordance with my invention will be dealt with in the following specification and are illustrated in the accompanying drawings. Throughout the specification and drawings like reference characters are employed to indicate corresponding parts, and in the drawings:

Fig. 1 is a lateral diagrammatic view of the problem.

Fig. 2 a face diagram view of the same.

Fig. 3 is an illustrative diagrammatic treatment showing modification of lens surface.

Fig. 4 is a diagrammatic view of an optical system in accordance with my invention.

Fig. 5 an exaggerated view of a portion of the curved surface of a modified lens in accordance with my invention, and Fig. 6 is a schematic illustration of an arrangement in accordance with my invention.

In considering a problem of the class herein involved in which wide angle projection is to be attained, I have, as heretofore suggested, selected pictorial projection as best adapted for the purposes of disclosures. As the projection of moving pictures so-called involved a rather extreme degree of magnification as well as other immediate and serious problems, I will discuss my invention particularly in connection with that art inasmuch as it involves certain novel phases of the combination. In fact, it may be convenient to approach the general problem through this specialized example in order to have certain desiderata as well as certain limitations in mind.

One of the reasons why the short range projection of moving pictures is so desirable is that with such means it is possible to remove the projector and its inflammable film from its previous menacing position to one of comparative safety, i. e. behind the proscenium arch and in a position to be cut off from the audience by the usual fire curtain.

The advantages of such a desired arrangement have been obvious from the start. The projection of stereopticon or magic lantern pictures on a translucent screen was common practice in times past, but the extreme magnification called for in modern pictorial projection as illustrated by the moving picture industry offered what seemed to be insurmountable difficulties. Wide angle projection lenses for detail such as pictorial or photographic minutiæ have generally been considered as impossible optics from the practical point of view. This was due to the extreme spherical aberrations involved, as well as to chromatic difficulties. Optical science has, of course, known how to correct for aberration and how to correct for color. Nevertheless, to the best of my knowledge and belief this knowledge has not been deemed applicable to produce practical results as required in this art. This is due to the difficulties in conditions and requirements between large lenses such as astronomical mirrors and relatively smaller optics such as the projection art requires. Furthermore, in the projection art there is the extreme difficulty of definiteness in correction sufficient to maintain detail without disturbing continuity of pictorial effect.

In Figs. 1 and 2 I have attempted to indicate diagrammatically the problem as it existed. In Fig. 1 L is an ordinary diverging lens, S the screen and C the curvature of the sphere concentric with the effective curvature of the lens L. As is well known the distortion as illustrated by this figure is due to the departure of the spherical surface of curvature C from the plane surface of the screen S. This gives what I have shown in Fig. 2 as a pin cushion effect P. The opposite or barrel effect is indicated by the circle B. In this case the square defined by the line X is what might be considered as the normal pictorial field defined on the screen by the aperture. In correcting for such difficulties we may consider the illustration of Fig. 3. In this a lens A has for example a central spheric surface as indicated between the lines R. Beyond that surface is a modified surface or annular portion indicated by $a$. Such an annular surface has been generally known in optics, but generally in connection with large mirrors where an aspheric surface is produced by working down the margins of a spheric. I mention this because while such a general surface has been known and while it has what might be called a theoretical application to my present invention, it is not a practical surface utilizable as such and my invention consists in part in a modification of this surface to get those results which make a new and revolutionary combination of projector screen and even theatre itself possible.

At this point attention is invited to the diagram shown in Fig. 5. This may be considered as the line of curvature from the center outwardly, O—O indicating the optical axis. In this we may consider the portion between this axis and the radius R as a spheric and the elements $z$ of the broken line extended beyond as indicating the plurality of surfaces each more divergent from the curvature of the sphere and each preferably of an increasing length as indicating a zone of greater width. Instead, therefore, of the continuous curvature $a$ of the lens margin outside of the spherical portion my lens has what may be considered as a plurality of definite annular surfaces constituting as a whole the general trend of the surface as indicated at $a$ in Fig. 3 different therefrom from the fact that they are definite independent optical surfaces of perfectly definite values. It is only possible to treat these surfaces diagrammatically because they are very narrow surfaces and their very narrowness is a factor which will be readily understood by those skilled in the art from the following.

The treatment of light by optics involving definite annuli necessarily results in the projection of differentiated rings on the intercept, as for example, on the screen S. By making these optical annuli, however, sufficiently narrow so that the rings on the intercept are of a width within the intercept of distinct vision, I find it possible to use these definite surfaces $z$ to eliminate spherical aberration to an extent that it is ignorable and without in the slightest disturbing the interpretive value of pictorial effects distributed zonally.

Referring to the problem in its practical present application, we may consider the area indicated by the bracket Y in Fig. 6 as that occupied by the audience. F may indicate the ordinary stage front, P the proscenium arch, S the screen and D the ordinary fire proof curtain. We may consider M as a moving picture machine and L—L as any lens system in accordance with my invention. In this arrangement it will be noted that the bracketed distance between the screen S and the back wall W is a relatively short distance as indicated at G. This distance ranges, I believe, from about twenty feet which represents a rather deep back stage, to something less than twenty feet in shallower stages, the average distance as I observed it being about fifteen feet. This back stage distance may be fairly termed a short range for projection. In using the words "short range" in my present discussion, I employ them in a relative sense, it being understood that the shorter the range the more serious the problem, and while the principles involved in my invention are undoubtedly applicable to advantage at longer distances, as well as shorter, such as store window picture display. I am discussing it particularly with reference to this back stage distance because it constitutes an immediate and definite problem. In practice the screen is always set back from five to ten feet from the proscenium arch, in order for front seat observation.

The advantages attained by the combination indicated in Fig. 6 are so obvious as hardly to need mention. I heretofore stated that the desirability of moving the projection apparatus and especially the film from the audience or from the proximity of normal exit and even from the sight of the audience in case of fire, has been written large in the tragedies of fire reports. The possibility of dropping an asbestos curtain as deep as the proscenium arch is obvious. There are, however, other advantages one of which I mention as very important. The long distance projection necessitated by the increase in size of the so-called movie house has necessitated a tremendous increase in power at the light source. With every increase of candle power the fire hazard is increased. Back stage projection requires only a portion of such illumination and herein lies the solution of many practical difficulties.

Returning once more to the matter of optics involved, it will be seen that the successive surfaces $z$ produce in general that hyperbolic tendency heretofore attained by the very delicate correction of a spherical lens. My lenses may therefore be considered generally as aspherics but the methematical definiteness of the successive annuli must be borne in mind. I do not mean by this that the annuli need to be maintained in true planes nor that they intersect each other sharply. I mean they must be of progressive divergence considered as planes and preferably of increasing width but of a sufficient narrowness to give on the picture a zonal width within the limits of distinct vision.

I have endeavored in Fig. 4 to show a practical system as employed by me in moving picture projection. I have indicated at 1 a standard projector lens which is about three inch focus. Such a lens unmodified projects a picture about twenty-one feet square at a distance of seventy feet. With this I combine a system consisting of a crown member 2 which I preferably form as a double concave lens the rear face having a central surface Z surrounded by a series of annular surfaces $z$ as described in connection with Fig. 5. The flint member 3 as shown is a plano-convex. The second system $2^1$, $3^1$ is used in practice to secure the desired corrected divergence and can be made to give a standardized size of picture of approximately twenty-one feet square at a distance of only seventeen feet. It may be noted by comparison that with the ordinary projecting lens at such a distance a picture of only five feet square could be attained.

My invention is, of course, capable of all the variations of optical design common to lens production and is not confined to the plano-concave system. In fact, it may be produced in meniscus form very satisfactorily. All such are capable of all the chromatic corrections by the relative figuring of the flint member 3 and the crown member 2. My invention may be practiced with any translucent screen and my combination of projector and lens system, screen and theatre may be made to suit any varieties of architecture or setting arrangement.

What I therefore claim and desire to secure by Letters Patent is:—

1. In combination in a projection equipment for backstage or like projection of abnormal wide angle on a relatively large screen, a projector having a long distance optical system but placed at a fractional distance of the normal front focus of its system from said screen, and a relatively larger negative lens of wide aperture inclusive of a concave side having a central spherical surface and a marginal aspheric surface progressively increasing in focal length toward the edge of the lens and spaced from the positive system to receive the normal projected beam therefrom and spread it without substantial change of the back focus of the projector.

2. In a projection equipment for backstage or like projection of abnormal wide angle on a relatively large screen, a projector having a long distance optical system but placed at a fractional distance of the normal front focus of its system from said screen, and a relatively larger negative lens of wide aperture inclusive of a concave side having a central spherical surface and a marginal aspheric surface progressively increasing in focal length toward the edge of the lens outwardly and disposed to receive the beam from the projector and spread it on the screen without substantial change of the back focus of the projector.

3. In a projection equipment for backstage or like projection of abnormal wide angle on a relatively large screen, a projector having a long distance optical system but placed at a fractional distance of the normal front focus of its system from said screen, and a relatively larger negative lens of wide aperture having concave surfaces of central sphericity but of marginally aspheric tendency progressively outwardly and spaced from the positive system to receive the normal projected beam and spread it without substantial disturbance of the back focus of the projector.

4. In combination with a positive optical projecting system of high magnification but low beam divergence, of a relatively larger negative lens of wide aperture and wide angle for projection on a flat display screen disposed at a distance from the projecting system abnormally short for its normal functions, said negative lens being inclusive of a concave side having a central spherical surface, and a marginal aspheric surface progressively increasing in focal length toward the edge of the lens whereby the distortion of the intercept of the wide angle spread of the beam is prevented.

5. In combination with a positive optical projecting system of high magnification but relatively low beam divergence, of a relatively larger negative lens of wide aperture and wide angle for projection on a translucent flat display screen disposed at a distance from the projecting system abnormally short for its normal functions, said negative lens being inclusive of a concave side having a central spherical surface and a marginal aspheric surface progressively increasing in focal length toward the edge of the lens, whereby the distortion of the intercept of the wide angle spread of the beam is prevented.

In testimony whereof I affix my signature.

WALTER G. WOLFE.